United States Patent [19]

Rivere

[11] 4,109,623

[45] Aug. 29, 1978

[54] REGULATOR FOR AUXILIARY AIR INJECTION AT THE INTAKE OF INTERNAL COMBUSTION ENGINES

[75] Inventor: Jean-Pierre Rivere, Paris, France

[73] Assignee: Regie Nationale des Usines Renault, France

[21] Appl. No.: 703,331

[22] Filed: Jul. 8, 1976

[30] Foreign Application Priority Data

Jul. 11, 1975 [FR] France ................................ 75 21960

[51] Int. Cl.$^2$ ............................................... F02M 7/24
[52] U.S. Cl. ................................................ 123/119 EC
[58] Field of Search ......... 123/32 EA, 32 EE, 119 R, 123/119 D, 119 DB, 119 EC

[56] References Cited

U.S. PATENT DOCUMENTS

| 3,866,588 | 2/1975 | Nakada et al. .................. 123/119 D |
| 3,977,375 | 8/1976 | Laprade et al. .................. 123/119 D |

*Primary Examiner*—Samuel Feinberg

*Attorney, Agent, or Firm*—Beveridge, DeGrandi, Kline & Lunsford

[57] ABSTRACT

A system for regulating the injection of auxiliary air into the intake of internal combustion engines includes a pressure-regulating stage feeding an intermediate compartment with an intermediate pressure proportional to that in the engine's intake manifold, and an opening-regulating stage through which air flows from the intermediate compartment toward the intake chamber communicating with the manifold. The opening-regulating stage includes a metering valve activated by a membrane which is controlled by a control pressure obtained by joining a compartment on one side of the membrane to intake pressure through a conduit having a metering orifice or choke thereon and also joining the compartment to an intermediate compartment through an electrically-activated valve the opening of which is controlled by a current at the frequency of the engine. The variable opening time of the electrically-activated valve is determined as a function of the engine frequency and the output from an overlying probe in the engine exhaust.

5 Claims, 2 Drawing Figures

REGULATOR FOR AUXILIARY AIR INJECTION AT THE INTAKE OF INTERNAL COMBUSTION ENGINES

BACKGROUND OF THE INVENTION

This invention relates to regulators for auxiliary air injection at the intake of internal combustion engines. Devices of this type are known and employed to correct the inadequate operational accuracy of conventional carburetors. One such prior art device is described in my French Pat. No. 74 32501, which discloses the use of an analyzing probe for the exhaust gases which delivers a signal to an electronic device which, through the intermediary of an electric valve, acts on a pneumatic valve controlled by partial vacuum and which regulates the intake downstream of the carburetor. Such systems constitute a control loop which will operate most accurately in the steady state or for very slow operational changes; however, they have generally not operated entirely satisfactorily when there are rapid changes in engine operation. It is, therefore, the object of the present invention to provide an improved regulating device that will operate very precisely even during sudden or rapid operational changes.

SUMMARY OF THE INVENTION

The invention consists in a device of the kind which includes a pressure-regulating stage feeding an intermediate compartment with an intermediate pressure proportional to that in the intake manifold, and an opening regulating stage through which the air flow from the intermediate compartment towards the intake chamber communicating with said manifold. The opening regulating stage comprises a metering valve actuated by a membrane controlled by a control pressure. A partition separates said intake chamber from an inside compartment corresponding to the side of the membrane which is subjected to the intake pressure at least during the periods of stable operation, the intake chamber communicating with the inside compartment through a first choke fashioned in said partition and preferably surrounding the connecting rod from the membrane to the metering valve. The control pressure is transduced by joining one outside compartment corresponding to the other side of the membrane on one hand with the intake manifold through the intermediary of a second choke and on the other hand with the intermediate compartment through the intermediary of an electric valve controlled by an electronic device operating at the frequency of the engine and emitting square pulses proportional in duration to the integrated value of the signal from the gas-analysis probe. The first and second chokes are determined as a function of the capacities of the inside and outside compartments in such manner that filling the inside compartment through the first choke for instance will be slower than filling the outside compartment by the second choke.

BRIEF DESCRIPTION OF THE DRAWINGS

Other particulars of the invention will appear in the description below of an illustrative embodiment shown in the attached drawing, where.

DESCRIPTION OF THE PREFERRED EMBODIMENTS

Figure 1:
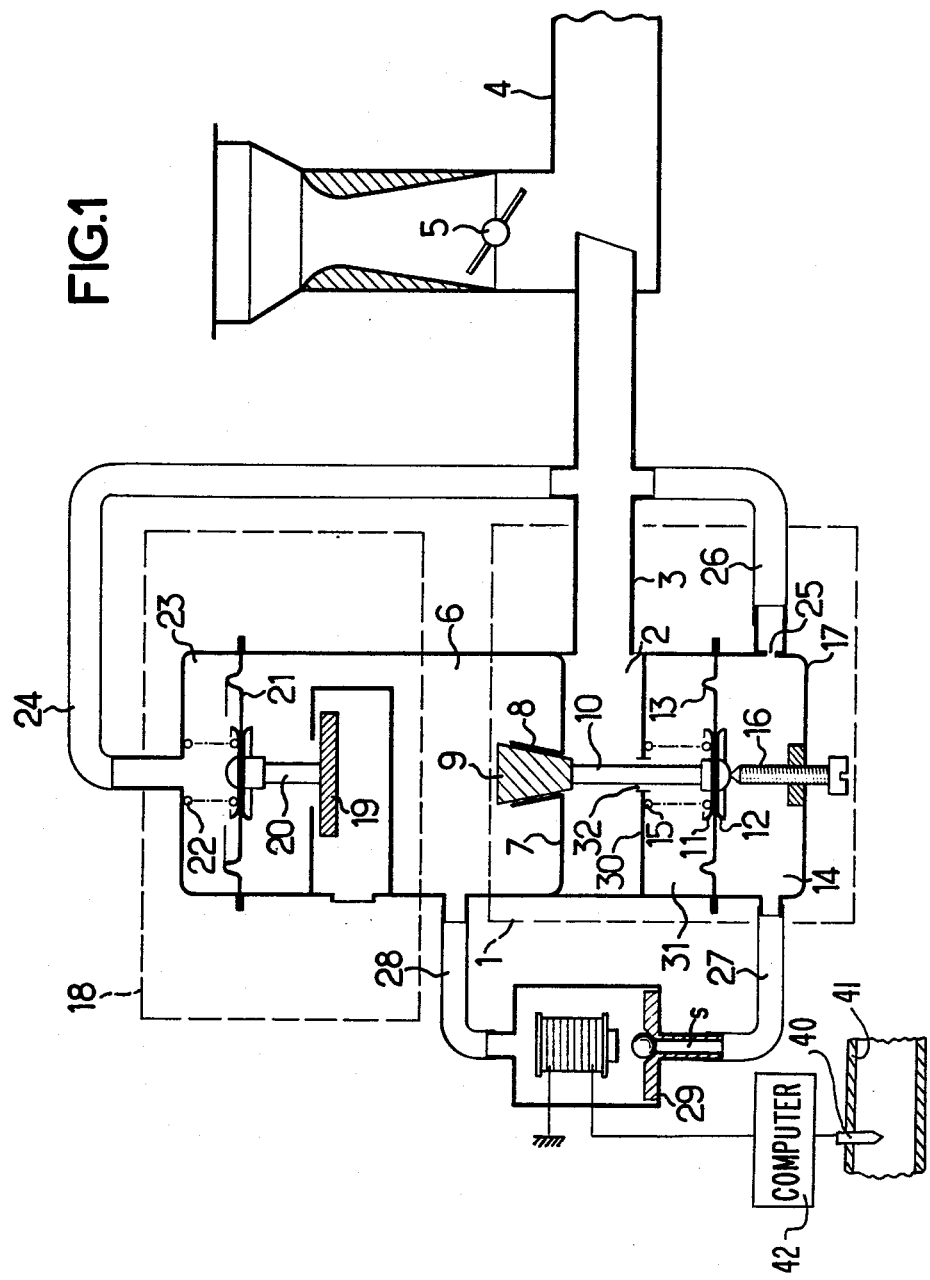
FIG. 1 is an overall diagram of the air injection device of the invention.

As shown in FIG. 1, the system comprises an opening regulating stage 1 of which the central compartment 2 is connected to a conduit 3 issuing into intake manifold 4 downstream of throttle valve 5. This opening regulating stage 1 is separated from an intermediate compartment 6 by a partition 7 comprising a seat 8 for metering valve 9 mounted on one end of control rod 10. Rod 10 has mounted on its other end plates 11 and 12 between which is compressed the central portion of a membrane 13 and below which there prevails a control pressure in an outside compartment 14. Intermediate compartment 6 is supplied with a partial vacuum by suitable means such as an orifice (not shown) in wall 7, preferably by an initial opening of valve member 9 determined by an adjustable stop consisting of a screw 16 threading in wall 17 of the outside compartment 14 so that the air flow feeding the engine at idle passes in whole or in part, as desired, through this intentional leak.

The system furthermore includes a pressure regulating stage 18 which actually regulates the pressure in the intermediate compartment 6 to a value which is proportional to the intake pressure in manifold 4 or in compartment 2. To that end, pressure regulating stage 18 comprises a valve member 19 controlling the fluid communication between intermediate compartment 6 and outside atmospheric pressure. Valve member 19 is mounted on and controlled via rod 20 which is supported on a second membrane 21 through clamping plates similar to plates 11, 12 on rod 10. Membrane 21 and valve member 19 carried thereby are actuated in a direction to open and close the valve by a spring 22 and by the intake pressure, which is applied to compartment 23 from conduit 3 or compartment 2 by means of conduit 24. Spring 22 is so adjusted that its force essentially corresponds to the thrust from atmospheric pressure on the effective cross-section of valve 19. It is thus apparent that under such conditions the intermediate pressure in compartment 6 is regulated to a value which is constantly proportional to the absolute intake pressure.

The position of valve member 9 relative to valve seat 8 is controlled by the pressure in chamber 14 below membrane 13. This control pressure is obtained by joining compartment 14 to intake pressure in conduit 3 or to compartment 2 by means of a conduit 26 housing therein a metering orifice or choke 25. At the same time, the side compartment 14 is joined to intermediate compartment 6 through the intermediary of conduits 27 and 28 between which is located a one-way electric-operated valve 29. This electric valve 29 is so powered in known manner by a square-wave or pulse train of frequency F corresponding to the engine speed and of which the time constant $t$ is modulated by electronics, not shown but known per se, depending both on the engine frequency and on the go/no-go outputs of a known exhaust gas probe. Given that this frequency is fairly high (10 to 100 Hz), and if $s$ is the cross-section for fully open electro-valve 29, the latter in alternating operation is equivalent to a reduced cross-section $sFt$ in magnitude. On the other hand, letting $P_a$ be the intake pressure and $P_c$ that in control compartment 14, it can be shown that $$P_c - P_a = (P_a r^2)/(1 + r^2)$$

where $r$ is the ratio of the equivalent cross-section just considered to the cross-section $s'$ of choke 25. Considering that $r^2$ is practically negligible with respect to unity, it is seen that $P_c - P_a$ is proportional to $P_a$ and to $F^2 t^2$. Therefore there is lack of linearity which, according to the invention, can be compensated by so relating $t$ to F that $t$ is inversely proportional to $\sqrt{F}$, so that the differential control pressure $P_c - P_a$ will be proportional to $P_a F$. Therefore this control pressure, or, in other words, the path of rod 10 or the aperture of metering slide 9, is proportional to $P_a F$, that is, to the air flow inhaled by the engine. The regulation of the invention therefore is proportional to a high degree within the range of use.

On the other hand, it was seen that the pulse train controlling valve 29 is a function of the output from a probe 40 sensing the exhaust gases within exhaust pipe 41. The output of probe 40 operating in the go/no-go mode within a narrow range of exhaust gas composition, first must be integrated by computer 42 over time. At the same time, as was noted above, time $t$ is corrected as an inverse function of $\sqrt{F}$. There is therefore integral correction.

Lastly, according to a particular of the invention, a partition 30 separates the intake chamber 2 from an inside compartment 31 located above membrane 13, the chamber 2 and compartment 31 communicating through a choke 32 preferably obtained by providing clearance or play between rod 10 and the orifice of wall 30 through which said rod passes. Furthermore this choke 32 is so selected that the constant factor of filling time to capacity of compartment 31 via choke 32, for instance, be less than the constant factor to filling time of capacity of compartment 14 via choke 25.

It will be seen that under such conditions the system of the invention not only will respond to the intake pressure, but also to variations in that pressure. If it be assumed that the absolute pressure $P_a$ suddenly increase as will be the case for instance when throttle valve 5 is suddenly opened prior to acceleration, pressure will increase more rapidly in compartment 31 than in compartment 14, so that the metering valve 9 will be closed and the auxiliary air injection will be reduced. This is a particularly advantageous effect, the mixture during this acceleration requiring enrichment while the accelerator pump's influence should be more or less left alone.

On the other hand, when the intake pressure $P_a$ drops suddenly, for instance when throttle valve 5 is suddenly closed prior to deceleration, compartment 31 will empty more rapidly than compartment 14, whereby valve 9 will be opened more. Again this is advantageous because the injection of auxiliary air is increased and parasitic recovery of the hydrocarbons deposited on the walls may be compensated, as otherwise there would be prohibitive enrichment. These last two effects may be summarized as being a differential closed-loop control.

It can definitely be stated therefore that the system of the invention allows a closed-loop control which simultaneously is proportional, integral and differential so that optimum operation is ensured by the theory of servo-mechanisms and information.

The rigorous proportionality between the displacement of rod 10 and the air inhaled by the engine, as shown above, allows making use of this pneumatic valve to add to its function of auxiliary air injection regulation that of controlling a variable nozzle for gasoline injection into a carburetor with constant partial-vacuum.

Figure 2:
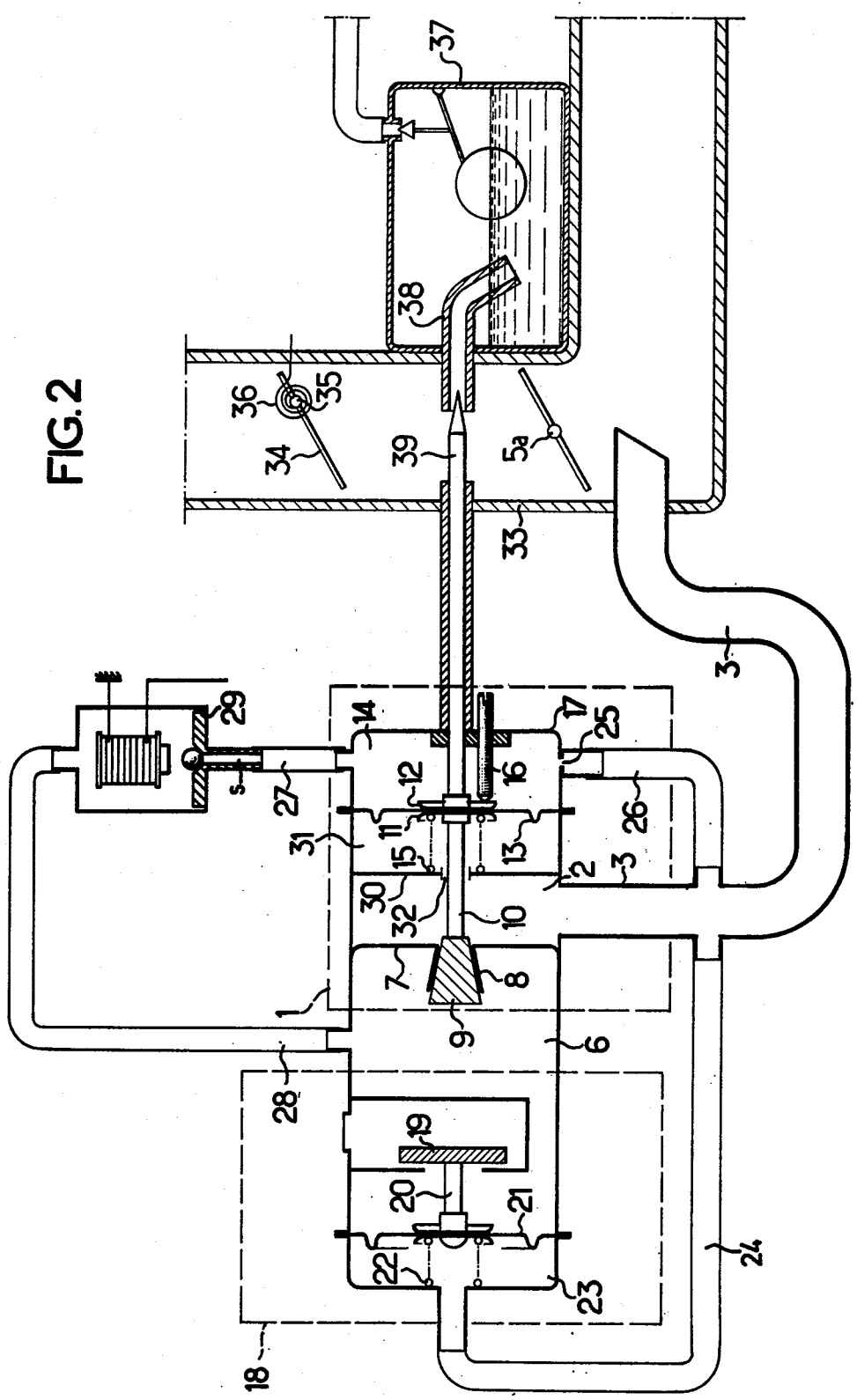
FIG. 2 is a schematic view of a carburetor with constant partial-vacuum of which the needle is controlled by the above device.

Such an embodiment is schematically shown in FIG. 2 representing a carburetor 33 of constant partial-vacuum and its eccentric choke 34 of which pivot shaft 35 is equipped with a return spring 36, further the throttle valve 5a below which is located air injection conduit 3. Also shown is the constant-level tank 37 feeding a nozzle 38 of which the rate is controlled by needle 39. In conformity with the invention, this needle 39 may be acted on directly from the air-injection valve, that is, it may be directly fixed to rod 10 of which it is an extension which hermetically passes through wall 17, stop screw 16 to that end being offset to the side or replaced by another stop device.

In this last case, the extreme simplicity of the carburetor so made is enhanced by the metering accuracy obtained from the set of closed-loop controls.

While I have disclosed and described preferred embodiments of my invention, I wish it understood that I do not intend to be restricted solely thereto, but rather that I intend to include all embodiments there of which would be apparent to one skilled in the art which come within the spirit and scope of my invention.

I claim:

1. A regulating system for auxiliary air injection at the intake manifold of an internal combustion engine comprising means defining an intake chamber adapted for communication with the intake manifold of an internal combustion engine; means defining an intermediate compartment having an opening for passage of air from said intermediate compartment to said intake chamber; pressure-regulating means for supplying air to said intermediate compartment at a pressure proportional to the intake manifold pressure; and opening-regulating means for regulating passage of air through said opening and including:

a metering valve within said opening;
   a membrane connected to said metering valve for actuation thereof;
   means defining an outer compartment having a first wall defined at least in part by said membrane;
   means defining a first conduit connecting said outer compartment with said intake chamber;
   a first choke in said first conduit for controlling the rate of air flow therethrough;
   a spring urging said metering valve in a direction to block passage of air through said opening;
   means defining a second conduit connecting said outer compartment with said intermediate compartment;
   probe means adapted for insertion into the exhaust line of the internal combustion engine for providing an indication of the oxygen content of the engine exhaust;
   an electrically-actuated valve in said second conduit; and
   means for supplying to said electrically-actuated valve a pulsed actuating current having a pulse frequency dependent upon the speed F of the internal combustion engine and a pulse duration proportional to $S/\sqrt{F}$, where S is the integrated value of the engine exhaust oxygen content indication.

2. A system as claimed in claim 1 further comprising means defining an inside compartment having one wall defined at least in part by the side of said membrane opposite said outer compartment, and a second wall in the form of a partition separating said inside compartment and said intake chamber, with a second opening in said partition to provide fluid communication between said inside compartment and said intake chamber; a second choke for controlling fluid flow through said second opening, said second choke being dimensioned such that the time required to fill said inside compartment with fluid through said second choke is less than the time required to fill said outside compartment through said first choke.

3. A system as claimed in claim 2 in which said second choke is defined by an orifice in said partition and a rod connecting said membrane to said metering valve and passing through said orifice.

4. A system as claimed in claim 1 in which said opening-regulating means further includes a rod connecting said metering valve and said membrane to control actuation of said metering valve and adapted to control actuation of a needle valve in the carburetor of an internal combustion engine to maintain the carburetor at a constant partial vacuum.

5. A system as claimed in claim 4 in which said rod includes an extension constituting the needle of the carburetor needle valve.

* * * * *